United States Patent [19]

Speech

[11] 3,985,688

[45] Oct. 12, 1976

[54] POLY (URETHANE-UREA) FOAM SEALANTS FOR UNDERGROUND APPLICATION AND FLUID PRECURSORS

[75] Inventor: Steven R. Speech, St. Paul, Minn.

[73] Assignee: Minnesota Mining and Manufacturing Company, St. Paul, Minn.

[22] Filed: Jan. 28, 1974

[21] Appl. No.: 437,061

Related U.S. Application Data

[62] Division of Ser. No. 254,527, May 18, 1972, Pat. No. 3,894,131.

[52] U.S. Cl. ............................ 260/2.5 AP; 61/36 R; 166/295; 260/2.5 AD; 260/2.5 BE; 260/29.2 TN; 260/32.8 N; 252/182
[51] Int. Cl.² .................. C08G 18/14; C08G 18/32; E02D 3/14
[58] Field of Search ............... 260/2.5 AD, 29.2 TN, 260/2.5 BE, 75 NE, 32.8 N, 2.5 AP

[56] References Cited
UNITED STATES PATENTS

| | | | |
|---|---|---|---|
| 2,726,219 | 12/1955 | Hill | 260/2.5 |
| 2,948,691 | 8/1960 | Windemuth et al. | 260/2.5 |
| 3,181,611 | 5/1965 | Dollarhide | 166/33 |
| 3,201,136 | 8/1965 | Harrison et al. | 277/198 |
| 3,607,837 | 9/1971 | Reegen et al. | 260/29.2 TN |
| 3,746,683 | 7/1973 | Salyer et al. | 260/33.2 R |
| 3,798,186 | 3/1974 | Nakade et al. | 260/2.5 AK |
| 3,805,531 | 4/1974 | Kistner | 260/29.2 TN |
| 3,805,532 | 4/1974 | Kistner | 260/2.5 AD |

OTHER PUBLICATIONS

"Carbowax" — Union Carbide Chemicals Co., New York, N.Y., 7 pages, (1957).
McClelland et al., *Technology of the Polyethylene Glycols & Carbowax Compounds*–Chem. & Engineering News, vol. 23, No. 3, pp. 247–251, (1945).
Flory, *Principals of Polymer Chemistry*—Cornell University Press, Ithaca, N.Y., (1953), pp. 266–275.
Schmidt et al., *High Polymer Theory & Practice*–McGraw–Hill, N.Y., (1948), pp. 237–238.
Golding–*Polymers & Resins*–Van Nostrand, Princeton, N.J., (1959), pp. 62–63.
Saunders et al., *Polyurethanes*, Part I. Interscience, New York, (1962), pp. 273–276.
Bender–*Handbook of Foamed Plastics*, Lake Publishing Co., Liberyvill, Ill., (1965), p. 126.
*Synthetic Organic Chemicals–Physical Properties*–Union Carbide Chemicals, New York, (1965), 5 pages.
"Carbowax Polyethylene Glycols"–Bulletin No. F–4772G, 1/72–10M of Union Carbide.

*Primary Examiner*—H.S. Cockeram
*Attorney, Agent, or Firm*—Alexander, Sell, Steldt & Delahunt

[57] ABSTRACT

A water-bearing structure, such as a sewer, water line or aqueduct, is sealed to prevent or minimize the leakage of water into or from said structure by placing at the locus of said leakage a fluid sealing composition comprising a water-miscible mixture of isocyanate-terminated polyoxyethylene urethane prepolymers in a compatible, water-miscible solvent, and curing said prepolymer by reaction thereof with water to form a seal at said locus.

9 Claims, 3 Drawing Figures

U.S. Patent  Oct 12, 1976  3,985,688
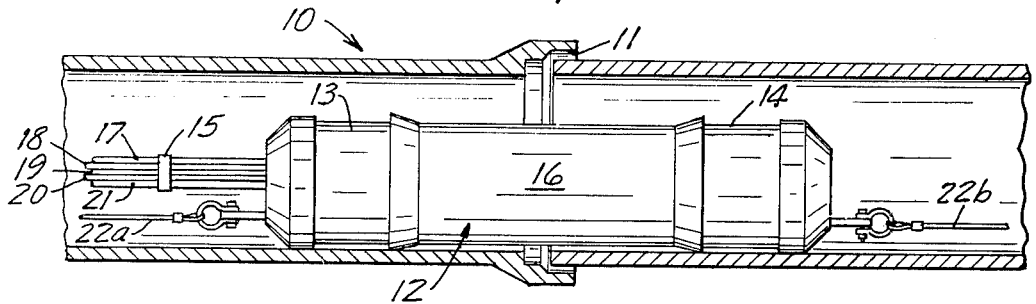
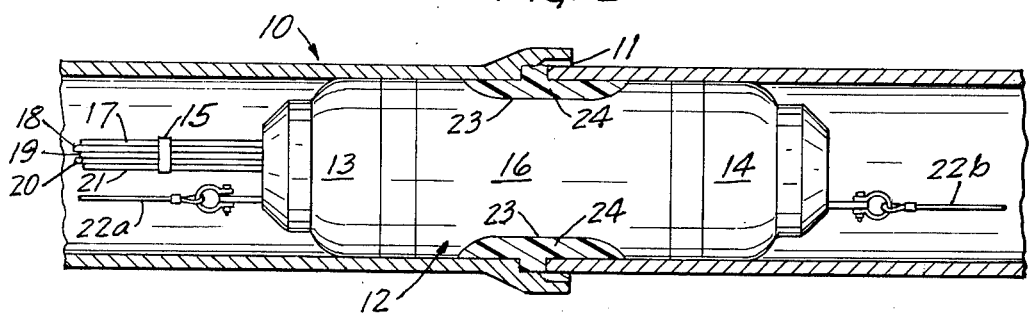
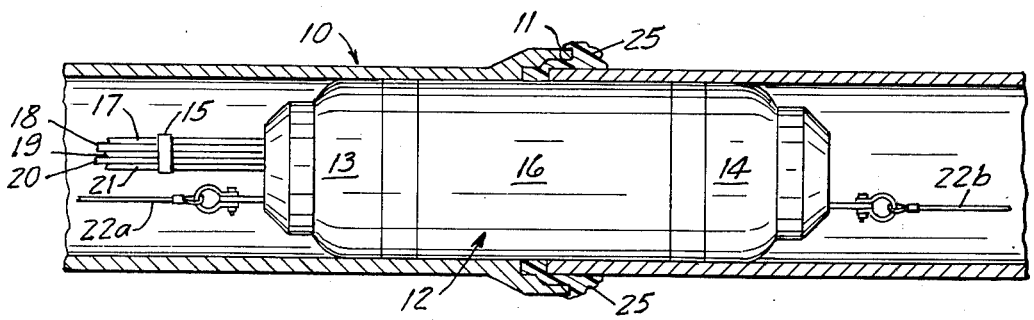

POLY (URETHANE-UREA) FOAM SEALANTS FOR UNDERGROUND APPLICATION AND FLUID PRECURSORS

This is a division of application Ser. No. 254,527 filed May 18, 1972, now U.S. Pat. No. 3,894,131.

This invention relates to a sealing material useful in sealing structures, such as sewer lines and manholes, to minimize or prevent water leakage through voids, joints, cracks, leached cement or other openings therein. In another aspect, it relates to a method for sealing such structures with said sealing material. In yet another aspect it relates to the structure so sealed.

There are a host of man-made water-bearing or holding structures disposed above or beneath ground level, such as sewer lines, manholes, aqueducts, tunnels, wells, settling ponds, and basements of buildings, made of materials such as siliceous materials, e.g., concrete, brick and mortar, plastics, e.g., polyvinylchloride, cast iron, or wood, e.g., cypress or cedar. Because of the nature of such construction material or the manner of constructing such structures or their locations, such structures inherently have, or develop with time, various discontinuities such as openings, cracks, fissures, joints, or the like which provide an entry or pathway for the undesirable ingress or egress of water into or from such structures. Even hairline cracks or pin-hole size openings in an otherwise sound or water-impervious structure can result in a damaging and costly leakage from a temporary or permanent water source. For example, sewer manholes made of concrete (a brittle and unyielding construction material) normally experience the incursion or leakage of ground water via the interfaces defined by the abutting components or members of the structure, or via joints, holes, cracks, or fissures in the structure. Such leakage is generally tolerable in sewers up to a certain point without affecting the usefulness and servicability of the structure. However, when a heavy rainfall occurs, a large amount of surface or run-off water penetrates the soil and accumulates in excavations surrounding the sewer line, raising the exterior hydrostatic head of the water, until the water leakage or incursion into the structure increases to an undesirable and even intolerable level. Since water has a propensity to find the path or drainage area of least resistance, the incursion of water into the sewer system may reach such high levels that the capacity of the downstream sewage treatment reservoir or pond is exceeded and untreated or insufficiently treated sewage is discharged to rivers or lakes causing pollution thereof. The water resulting from such incursion may also cause the flooding of basements of buildings.

Water-holding structures, such as concrete irrigation water courses or aqueducts or dikes, bearing a static head or flowing stream of water, also experience leakage due to holes, cracks, fissures, and the like, such leakage being an uneconomical loss of water as well as hazardous in many circumstances.

A host of sealing compositions and sealing techniques have been used to prevent the ingress or egress of water into or from such structures. Some sealing materials, such as mortar, shrink upon setting and curing to create cracks or fissures. Some sealants which are pumped into soil surrounding the structure to be sealed are limited to fine grain sand or soil. Other sealing materials must be placed in a dry environment or used in a dry, powdered form and they, consequently, lack mobility and cannot be extensively dispersed or placed in large leakage or drainage areas. Some sealing compositions require heat, or contain water-immiscible hydrocarbon solvents, and thus, their application is costly and generally limited to dry, clean environments. Other multi-component systems require careful metering and mixing or have a limited pot life. The application equipment for many of the prior art sealing techniques is cumbersome and costly and many of these techniques are limited only to areas which are readily accessible, easily dried, and suitable for cleaning.

Solvent-thinned compositions comprising isocyanate-terminated prepolymers based on polyols, e.g., castor oil, polyester-polyols, and polyalkylene glycols and catalysts such as N-methyl morpholine, have been disclosed as coating and sealing agents for hydraulic cement (see U.S. Pat. No. 2,902,388). Also known are moisture curing urethane sealants resulting from the reaction of isocyanate prepolymers with moisture in the air. A group of isocyanate-terminated prepolymer sealants commercially available is listed in "Sealant" by Damusis, Reinhold (1967), page 156. The prior art isocyanate-terminated prepolymer sealants have generally been water-immiscible due to the exclusion of large amounts of polyoxyethylene from the prepolymer sealants which was previously thought necessary to insure a good water-resistant sealant (see Damusis, supra, page 132).

Briefly, the subject invention in one aspect provides a sealing composition comprising a mixture of controlled molecular weight isocyanate-terminated prepolymers of polyoxyethylene polyol in a compatible water-miscible solvent. The sealing composition is intimately mixed with water at the locus to be sealed, such as the interface between abutting or contiguous members of a water-bearing structure, where it is desired to prevent or minimize the ingress or egress of water. Said prepolymers react with the water to form a crosslinked, foamed poly(urethane-urea) polymer. A catalyst, e.g., tertiary amine, can be added to the water which reacts with the prepolymer mixture to increase the reaction rate, and a foam stabilizer may also be added to provide a more uniform foam. The foamed polymer acts as a sealant to obstruct the flow of water into or from the structure. The injection or placement of the sealing composition is normally accomplished in a wet structure or during the leakage of water into or from the structure.

An embodiment of the method useful for sealing a joint in a concrete sewer line using the composition of this invention and to the joint so sealed is illustrated in the accompanying drawing in which:

FIG. 1 is a view in elevation of a three element packer disposed in a sewer line (shown in cross-section) in the vicinity of a joint in the line;

FIG. 2 is a view of the packer of FIG. 1 expanded at its ends to isolate the joint and form a circular cavity at the locus of the joint which is filled with polymeric foam; and FIG. 3 is a view of the packer of FIG. 1 fully expanded to force the polymeric foam from the cavity into the joint.

Referring to the accompanying drawing and initially to FIG. 1, reference number 10 denotes generally a sewer line having a joint 11 through which the incursion of water into the sewer line is occurring or may occur. Disposed within the line 10 is a packer 12 with three inflatable diaphragm sections 13, 14, 16, shown in FIG. 1 in their collapsed conditions, which can be inflated by means of air. The air used to inflate the packer 12 is delivered to the packer by means of the hoses 17, 18, 19, each hose serving to inflate one of the packer sections. The prepolymer mixture of this invention is delivered to the packer via hose 20 and the water required for reaction via hose 21, all of said hoses being held together by band 15. The packer 12 can be positioned by means of cables 22a,22b attached to the packer and to an external means for moving the packer, e.g., winches.

In FIG. 2, the outer sections 13, 14 of the packer 12 have been inflated, isolating the joint 11 and forming a circular or annular cavity 23 at the locus of the joint. The sealing composition of this invention is injected in a controlled amount into the cavity 23 together with water, for example by spraying separate streams of these materials into the cavity in such a manner as to cause the two sprays to impinge, thus ensuring rapid admixture and reaction.

In a short time, e.g., 30 seconds after the injection, a thick foamed cream 24 forms in the cavity 23 and the center section 16 is inflated as shown in FIG. 3, forcing the still reacting cream into the joint 11. After about 5–7 minutes, the cream 24 will have formed a non-tacky, self-supporting poly(urethane-urea) foam 25 which seals the joint 11. The packer 12 can be deflated and moved by cables 22 to the next joint where the operation is repeated.

Water-miscible isocyanate-terminated prepolymers useful in this invention can be expressed in terms of the formula:

$$Y_1[(RO)_o-C(O)NH-R'(NCO)_p]_z \qquad I$$

In formula I, $Y_1$ is an active hydrogen-free residue of a compound having a plurality of active hydrogen atoms such as a polyhydroxyalkane, e.g., ethylene glycol, glycerol, or 1,1,1-trimethylolpropane. $(RO)_o$ is a hydrophilic poly(oxyalkylene)chain having a plurality of oxyethylene units, such as (1) a poly(oxyethylene) chain (the preferred type of chain), (2) a chain having alternating blocks or backbone segments of oxyethylene units, or (3) a chain of randomly distributed (i.e., a heteric mixture) of oxyethylene and oxypropylene units. The subscript $o$ is the number of oxyalkylene units in said poly(oxyalkylene) chain, this number being sufficient to impart water-miscibility to the prepolymer. The moiety —C(O)NH— together with the adjacent oxygen atom of the poly(oxyalkylene) chain is a carbamate (or urethane) group resulting from the reaction of a hydroxy group from a poly(oxyalkylene) polyol precursor with an isocyanate moiety from a polyisocyanate precursor. R' is a residue or nucleus of the polyisocyanate precursor, and is preferably an aromatic nucleus, e.g., tolylene, and $p$ is an integer generally 1–5 equal to $q-l$ where $q$ is the number of isocyanate moieties of said polyisocyanate precursor. The subscript $z$ is a number equal to the functionality or number of said active-hydrogen atoms in said compound (e.g., said polyhydroxyalkane or polyaminoalkane) and generally $z$ will be 2–6. The terminating isocyanate groups can react with water, resulting in the formation of a poly(urethane-urea) foam with limited water permeability.

The term "active hydrogen atom" as used herein refers to a hydrogen atom which reacts with the isocyanate moiety under urethane or urea bond-forming conditions, (determined by the Zerewitinoff procedure, *Journal of American Chemical Society*, 49, p. 3181 (1927) such as that disclosed in U.S. Pat. No. 3,330,782). The term "water miscible" in this context means that the prepolymer is readily dispersible or soluble in water.

Preferred water-miscible prepolymers within the scope of this invention are those of the formula:

$$Y_1[(CH_2CH_2O)_o-\overset{O}{\overset{\|}{C}}NH-R'(NCO)_p]_z \qquad II$$

where $Y_1$ is the active hydrogen-free residue of a low molecular weight polyhydroxyalkane, such as ethylene glycol, and R' is an aromatic nucleus, such as tolylene. The subscript $o$ is the number of oxyethylene units necessary to make the prepolymer water-miscible. The integers $p$ and $z$ are as defined above for formula I.

Another subclass of water-miscible prepolymers useful in this invention can be expressed by the formula:

$$Y_1[(CH_2CH_2O)_a(\overset{CH_3}{\overset{|}{C}HCH_2O})_b(CH_2CH_2O)_c-\overset{O}{\overset{\|}{C}}NH-R'-NCO]_z \qquad III$$

where $Y_1$, R' and $z$ are as defined in the formula II and $a$, $b$, $c$ are integers such that the ratio of $(a+c)/b$ is greater than one and thus the prepolymers are water-miscible.

When the prepolymers of formulas I, II, and III are used in the application of this invention, the polyurethane prepolymer mixtures react with the water injected with the prepolymer, forming in situ a crosslinked, cured poly(urethane-urea) polymer foam which will be slightly water-swellable when in contact with water due to the hydrophilicity of the polyoxyalkylene backbone of the foam seal.

Sealing compositions of this invention when reacted with water form a stable self-supporting foam in a very short time, e.g., about 2–7 minutes, although the time necessary to form a self-supporting foam will vary depending on the ambient temperature, with a longer cure time usually being necessary in colder conditions. This means, for example, a large number of joints in a sewer line can be sealed in a working day. Sealant compositions of this invention also form foams which exhibit good compressive recovery and maintain a seal in a joint through cycles of expansion and contraction as well as cyclical changes from wet to dry conditions. The seal also has a substantial resistance to the chemical, physical, and biological activity of sewage.

The isocyanate-terminated prepolymers used in this invention can be tailored in structure to obtain controlled water-miscibility in order to attain practical reaction times and achieve desired physical properties in the reacted foam. Prepolymers, having a structure like formula II, with a high molecular weight of about 1250–1550, have a high rate of reaction and also a high degree of hydrophilicity. The high degree of hydrophilicity results in a foam which undergoes marked swelling when wet. However, contraction of the foam when dry can be great enough to break the seal between a substrate such as concrete and the foam, resulting in water incursion. Prepolymers having a structure like formula II, and a molecular weight of about 850–1000, produce foam with improved resistance to cycles of drying without separating from the structure sealed. However, these low molecular weight prepolymers have a lowered degree of hydrophilicity, e.g., about 40 percent of that of the high molecular weight prepolymers, and the low molecular weight prepolymers will not usually cure quickly to a self-supporting foam.

It has been found that by mixing one prepolymer having a low molecular weight with a second prepolymer having a high molecular weight, a prepolymer mixture, with an average molecular weight of about 1000–1300, is provided which rapidly reacts with water to produce a foam which will not shrink excessively and pull away from the sealed structure upon dehydration of the foam. Though the mechanism for this phenomenon is unknown, it is believed that the more miscible high molecular weight prepolymer component upon reacting with water provides a fast-setting network of expanded surface which acts as a water carrier to increase the reactivity of the low molecular weight prepolymer component with water. The low molecular weight component provides the foamed product with the higher strength levels and improved resistance to shrinkage under dehydrated conditions. Other fomulations of polyoxyethylene prepolymer mixtures having average molecular weights of about 1000–1300 can be formulated which exhibit the desired properties of reactivity, strength, and shrinkage resistance. Prepolymers containing polyoxypropylene can be used as part of the prepolymer mixture because the polyoxypropylene units in the prepolymer will confer additional control of the hydrophilicity and shrinkage of the cured foam.

The preparation of isocyanate-terminated prepolymers, such as those used in the sealing composition of this invention, and the reaction thereof with water to form a polyurea, is disclosed in the art, e.g., U.S. Pat. Nos. 2,726,219 and 2,948,691, particularly Example 8, and "Polyurethanes:Chemistry and Technology" by Saunders and Frisch, Part I, Interscience Pub., N.Y. (1962).

The urethane prepolymers used in this invention can be prepared by reacting an aliphatic or aromatic polyisocyanate with a polyoxyethylene polyol using an NCO/OH equivalent ratio of at least 2/1 and preferably slightly higher than this, e.g., 2.1/1 to 2.5/1.

To insure water-miscibility, the poly(oxyethylene) glycol will generally having molecular weight range of about 500–1200. Commercially available polyol precursors or bases useful in making the above-described water-miscible isocyanate-terminated prepolymers are the hydrophilic polyoxyethylene polyols, e.g., "Carbowax." The degree of overall hydrophilicity of the prepolymeric mixtures can be modified by using small amounts of poly(oxyethylene-oxypropylene) polyols sold under the trademark "Pluronic," such as Pluronic L35, F38, and P46, or hydrophilic polyols with heteric oxyethylene-oxypropylene chain sold as Polyol Functional Fluids, such as WL-580, WL-600, and WL-1400. Generally, the hydrophilic, water-soluble oxyethylene-containing polyols to be used will have molecular weights of at least 400 and as high as 2000; preferably they will have molecular weights of 600–1000.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also usable. These polyisocyanates are commercially available under the trademark "Highlene TM, NACCONATE 80, and MONDUR RD-80". Other usable polyisocyanate compounds which can be used are other isomers of tolylene diisocyanate, hexamethylene-1,6-diisocyanate, diphenylmethane-4,4'-diisocyanate, m- or p-phenylene diisocyanate and 1,5-naphthalene diisocyanate. Polymeric polyisocyanates can also be used, such as polymethylene polyphenyl polyisocyanates, such as those sold under trademarks, "Mondur MRS," and "PAPI." A list of useful commercially available polyisocyanates is found in Encyclopedia of Chemical Technology by Kirk and Othmer, 2nd Ed., Vol. 12, pages 46, 47, Interscience Pub. (1967).

The isocyanate-terminated prepolymers and mixtures thereof used in this invention have a freezing point range which is approximately 40°–70° F., thereby limiting the usefulness of the prepolymer as a sealing agent in environments where the temperature is often below the freezing points of the prepolymers or when the prepolymers and associated equipment are above ground at the solidification temperatures of the prepolymers. However, by dispersing the prepolymers in a solvent, pumping and handling is enhanced and the range of temperatures at which sealing operations can be conducted is extended. The solvents used to dissolve the prepolymers are water-miscible, polar organic solvents which are preferably volatile at the ambient conditions of the environment where the sealing composition is to be used. The solvent chosen should be such that the resulting solution of prepolymers and solvent will not freeze at the ambient conditions present in the environment where the structure to be sealed is located. For example, where the ambient temperature is above 50° F., a solution of about 60–90 weight percent of prepolymer solids in dry acetone is very effective sealant composition.

The sealing composition of this invention will preferably include a foam stabilizer which contributes to the formation of a uniform foam having good mechanical properties and density. The cured foams will have densities of about 5 to 35 pounds per cubic foot, preferably about 8–15 pounds per cubic foot. Foam stabilizers useful in this invention include nonionic surfactants, e.g., the condensation products of ethylene oxide with an alkyl phenol, ("Triton" X-100, "Tergitol" NP-27), silicone surfactants, e.g., polyethylene oxide adducts of polyalkylsiloxane ("L-520", "L-540"), as well as other anionic, nonionic, or fluorochemical surfactants.

Chlorinated solvents, e.g., dichloromethane, dichloroethylene, trichloroethane, etc., or nitrogenated, e.g., nitromethane, nitroethane, acetonitrile, etc., solvents also can be used. These solvents provide a prepolymer solution which is less soluble in water and dispersing agents or emulsifiers can be added to the solution to increase the miscibility of the prepolymer solution and maintain a practical cure time.

The uncatalyzed curing rate of the polyurethane prepolymer mixture of this invention at the ambient temperatures normally encountered in sewer lines and other underground water-bearing structures is relatively slow. For example, at 49° F. the curing time of the polyurethane prepolymer having a molecular weight of about 1350 with water is approximately 13½ minutes and at 36° F. the same prepolymer requires 18 minutes to cure, with the gelled foam not reaching a tack-free state for at least 30 minutes. While this reaction time is considerably faster than many of the prior art sealing compositions which require as much as 24 hours to cure, it is insufficient where the prepolymer is to be used at the locus of incursion of free-flowing water which will tend to carry the prepolymer away from the site of water incursion. The addition of a base as a catalyst, e.g., tertiary amine catalyst, 2,4,6-tridimethyl aminomethylphenol, 1,4-diazabicyclo (2,2,2)-octane, triethylamine or other amines and metal compound catalysts known in the urethane art, reduces the cure time at ambient sewer temperatures (e.g., about 50° F.) to about 2-7 minutes under normal conditions. The tertiary amines are added to the prepolymer in amounts of about 0.1 to 1.0 parts by weight of prepolymer or the catalysts may be added to water used as a coreactant. The basic catalyst used in small amounts results in improved cure rates without detracting from the physical properties of cured foam.

The prepolymer can be mixed with various fillers, and pigments to change the physical properties of the hydrogel. Fungicides may also be added to prolong the life of the hydrogel and prevent attack by various fungi, or phytotoxic agents, e.g., copper salts to prevent the encroachment of plant roots. Also useful as fillers are latices, e.g., acrylic based latices, which can be added to the water used as a coreactant with the prepolymer. Care should be excerised in choosing fillers and other additives to avoid fillers which will have a deleterious effect on the foams stability.

Objects and advantages of this invention are illustrated in the following examples, however, various materials and amounts described in this example, the various other conditions and details recited therein, should not be construed to limit the scope of this invention. All parts of the examples are given as parts by weight unless otherwise specified.

EXAMPLE 1

This example illustrates the preparation of a high molecular weight prepolymer useful in this invention.

One thousand parts polyoxyethylene diol ("Carbowax" 1000 having a molecular weight of about 1000) was stirred and reacted with 351 parts of tolylene diisocyanate (80/20 mixture of the 2,4- and 2,6-isomers) under substantially anhydrous conditions for about 2 hours and the reaction mixture allowed to stand for several days. The resulting isocyanate-terminated hydrophilic prepolymer was a viscous liquid, at 25° C., having a structure like said formula II where $Y_1$ is a residue of ethylene glycol, R' is tolylene, $o$ is about 11, $p$ is 1 and $z$ is 2. The resulting material was then cooled and drained into 1 gallon cans which had been purged with dry nitrogen.

EXAMPLE 2

An isocyanate-terminated prepolymer solution was prepared comprising 42.5 parts of 600 molecular weight polyoxyethylene glycol reacted with tolylene diisocyanate, 42.5 parts of 1000 molecular weight polyoxyethylene glycol reacted with tolylene diisocyanate, 14.9 parts urethane grade (dry) acetone and 0.12 part nonionic surfactant ("Triton" X-100). The resulting solution had an isocyanate equivalent weight of 762 (100% solids) and a viscosity of 285 centipoise at 72° F. (at least 85% solids Brookfield). Water containing 0.4 parts (2,4,6-tridimethylamino-methylphenol) tertiary amine catalyst was used as a coreactant.

A 176 foot long sanitary sewer line 8 inches in diameter and with joints at 4 foot intervals was sealed with the above coreactants. Prior to sealing, extensive ground water infiltration (of about 60 gallons per minute) was observed visually. The equipment used for sealing was a three element sewer packing device, such as that depicted in the drawing, with a television monitor manufactured by Cherne Industrial Co. The sewer packing device was moved by cables attached to two winches, the winches located at manholes at each end of the sewer section to be sealed, these winches allowing forward and backward movement of the sewer packer, with remote television system, for proper positioning.

When the sewer packer was properly positioned astride the joint, two pressurizable diaphragms were inflated with air to a pressure of up to 35 psi, sealing the sewer line and isolating a small section of the sewer line. Water was pumped into the isolated section cavity between the diaphragms and, if no detectable pressure rise was noted, excessive leaking was indicated.

If the joint needed sealing, equal parts of the coreactants, about 8 fluid ounces each, were pumped into the packer's cavity between the diaphragms, the water and prepolymer being sprayed into the cavity as impinging streams, thereby being thoroughly mixed during injection into the cavity. The polymer solution and water were allowed to react for 25 seconds at which time the reacting foam mass was displaced into the sewer joint and held there for 2.5 minutes. This displacement was accomplished by inflating with air a third inflatable diaphragm located between the two diaphragms used to seal the sewer line, the foam mass being held in the sewer joint by keeping the inflated diaphragms in place.

After the foam was cured to a non-tacky state, the center diaphragm was deflated and water pumped into the cavity to determine if the joint was sealed and the cavity would hold pressure. If the pressure rise was noted, the joint was considered sealed and the packer moved to another defect. If the seal did not hold pressure, additional prepolymer and water was pumped into the cavity and the sealing process repeated until the defect or joint tested water tight. The resulting foam seal was a partially cured, self-supporting and substantially tack-free poly(urethane-urea) foam which will continue to cure to a fully-cured foam in about 12-24 hours.

All of the joints in the 176 foot sewer section were sealed in this manner and a substantial reduction in water infiltration was noted.

Various modifications and alterations of this invention will become apparent to those skilled in the art without departing from the scope and spirit of this invention, and it should be understood that this invention is not to be limited to the illustrative embodiments set forth herein.

What is claimed is:

1. A water-miscible fluid composition comprising a water-miscible mixture, having an average molecular weight of about 1000–1300, in a compatible water-miscible solvent of a water-miscible isocyanate-terminated polyoxyalkylene urethane prepolymer component having a molecular weight of 1250 to 1550 and a water-miscible isocyanate-terminated polyoxyalkylene urethane prepolymer component having a molecular weight of 850 to 1000, said prepolymer components having a plurality of oxyethylene units sufficient to render the same water-miscible and being reactable with water to form a foamed poly(urethane-urea).

2. The composition according to claim 1 further comprising a foam stabilizing agent.

3. A water-miscible fluid composition comprising a water-miscible mixture, having an average molecular weight of about 1050–1250, in a compatible water-miscible solvent of a water-miscible isocyanate-terminated polyoxyethylene urethane prepolymer having a molecular weight of about 1350 and a water-miscible isocyanate-terminated polyoxyethylene urethane prepolymer having a molecular weight of about 950, said prepolymer components having a plurality of oxyethylene units sufficient to render the same water-miscible and being reactable with water to form a foamed poly(urethane-urea).

4. The composition according to claim 2 wherein said solvent is acetone.

5. The composition according to claim 3, further comprising a tertiary amine catalyst and a nonionic surfactant.

6. The composition according to claim 2 wherein said prepolymer components are the reaction products of poly(oxyethylene) glycol and excess tolylene diisocyanate.

7. A fluid water-miscible fluid composition comprising a water-miscible mixture, in a compatible water-miscible solvent, of an isocyanate-terminated polyoxyethylene urethane prepolymer component having a molecular weight of about 850–1000 and an isocyanate-terminated polyoxyethylene urethane prepolymer component having a molecular weight of about 1250–1550, said mixture having an average molecular weight of about 1000–1300, said prepolymer components being reactable with water to form a foamed poly(urethane-urea).

8. A water-miscible fluid composition comprising a water-miscible mixture of two isocyanate-terminated urethane prepolymer components having a formula

where Y is the active hydrogen-free residue of a compound having a plurality of active hydrogen atoms, $(RO)_o$ is a hydrophilic poly(oxyalkylene) chain made up of oxyethylene units or oxyethylene and oxypropylene units, said chain having a plurality of oxyethylene units sufficient to make said prepolymer components water-miscible, R' is the isocyanate-free residue of a polyisocyanate, $p$ is an integer of 1–5, and $z$ is an integer equal to the number of active hydrogens present in said compound, one of said prepolymer components having a molecular weight of about 850–1000 and the other of said prepolymer components having a molecular weight of about 1250–1550 with the average molecular weight of said mixture of prepolymer components being about 1000–1300, said prepolymer components being dissolved in a polar water-miscible solvent and being reactable with water to form a foamed poly(urethane-urea).

9. A water-miscible fluid composition comprising a water-miscible mixture of two isocyanate-terminated urethane prepolymer components having the formula

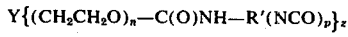

where Y is the active hydrogen-free residue of a compound having a plurality of active hydrogens, $n$ is the number of oxyethylene units sufficient to make said prepolymers water-miscible, R' is the isocyanate-free residue of a polyisocyanate, $p$ is an integer of 1–5, and $z$ is an integer equal to the number of active hydrogens present in said compound, one of said prepolymer components having a molecular weight of about 850–1000 and the other of said prepolymers having a molecular weight of about 1250–1550 with the average molecular weight of said mixture of prepolymer components being about 1000–1300, said prepolymer components being dissolved in a polar water-miscible solvent and being reactable with water to form a foamed poly(urethane-urea).

* * * * *